Sept. 23, 1969        R. A. GRAY        3,468,339
PNEUMATICALLY OPERATED MIXING VALVE
Filed March 3, 1967
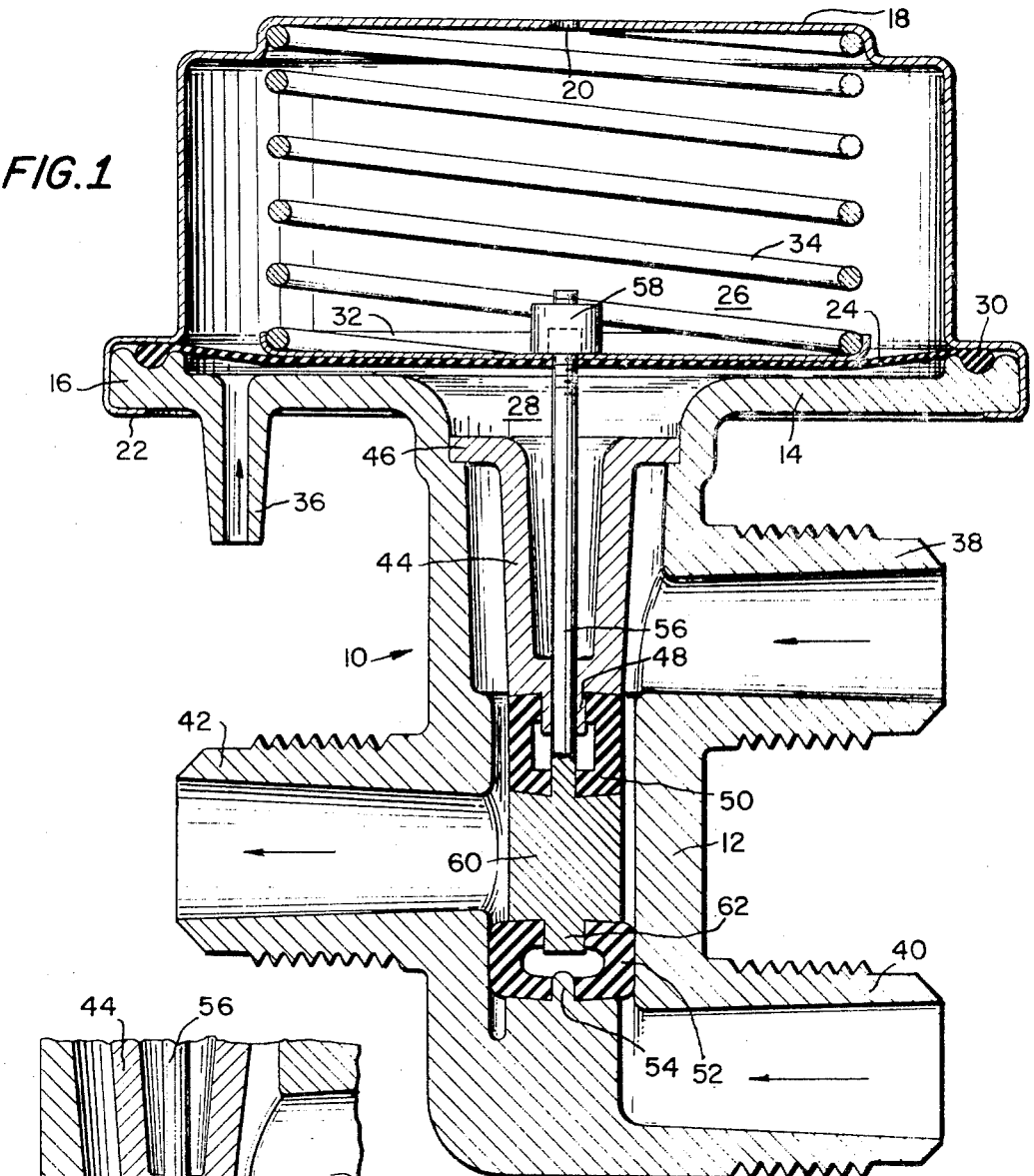
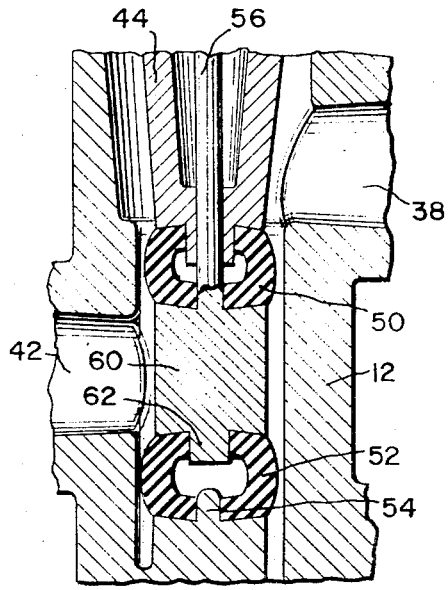
*INVENTOR.*
ROBERT A. GRAY
BY Anthony A. O'Brien
ATTORNEY United States Patent Office 3,468,339
Patented Sept. 23, 1969

3,468,339
PNEUMATICALLY OPERATED MIXING VALVE
Robert A. Gray, Goshen, Ind., assignor to Robertshaw
Controls Company, Richmond, Va., a corporation of
Delaware
Filed Mar. 3, 1967, Ser. No. 620,486
Int. Cl. F16k *11/02, 31/145, 25/00*
U.S. Cl. 137—625.4                                    10 Claims

ABSTRACT OF THE DISCLOSURE

A control device including a pneumatically operated pressure regulator assembly, a valve assembly having a body member with a plurality of fluid inlets and a common outlet, a plurality of deformable, resilient plugs disposed between the fluid inlets and the discharge outlet, a force-transmitting mechanism interconnects the pressure regulator and the plugs to exert axial forces upon the plugs and deform same, thus varying the mixture of the fluids passing through the body member in accordance with a pressure signal applied to the regulator assembly.

---

This invention relates generally to pressure responsive control devices, and more particularly to pneumatically operated control devices for controlling the resultant flow of a plurality of fluids through a common conduit.

An object of this invention is to position a plurality of deformable plugs within the interior bore of a valve body to vary the mixture of fluids passing through such body in response to a signal applied to a pressure responsive member.

Another object is to provide a plurality of deformable plugs within the valve body, certain plugs being deformed by compressive forces while other plugs are simultaneously being subjected to tensile forces.

Still another object is to provide a versatile control device that can be pneumatically operated either as an on-off control or as a mixing valve.

This invention has additional objects in that this control device isolates the fluid flow through the valve from the controlling pneumatic pressure signal.

In practicing the present invention, a pressure responsive control device is constructed and arranged to include a housing with inlet and outlet ports, the inlet port being adapted to be connected to a source of pressure, the outlet port communicating with ambient pressure, a pressure responsive member disposed within the housing for regulating the pressure between the inlet and outlet ports, a body member having a plurality of inlet conduits and an outlet conduit, each of said inlet conduits adapted to be secured to a source of fluid and said outlet conduit discharging a mixture of the fluids, a plurality of deformable valve members disposed between the inlet conduits and the outlet conduit, and a force-transmitting mechanism interconnecting the pressure responsive member and the plurality of valve members to deform such members and vary the mixture of fluids flowing through the body member in response to a pressure signal applied to the pressure responsive member.

Other objects and advantages of the present invention will become apparent from the following description when construed in conjunction with the single sheet of drawing, wherein:

FIG. 1 is a vertical cross-section of a control device embodying the principles of the present invention; and FIG. 2 is a partial cross-section of a detail of FIG. 1.

As illustrated in FIG. 1, a preferred embodiment of the present invention includes a hollow body member 10 having a centrally bored vertical conduit 12 and an annular, horizontal wall 14 with a centrally located, downwardly opening orifice. A vertical extension on the circumference of the wall 14 defines a grooved flange 16. A dome-shaped cover 18 has an atmospheric port 20 in one wall and has an annular flange 22 on its peripheral lip which is deformed so as to define a clamping flange.

A flexible diaphragm 24 separates the central hollow portion between casing wall 14 and cover 18 into upper and lower chambers 26 and 28, respectively. The periphery of diaphragm 24 has an annular sealing bead 30 nesting in grooved flange 16 whereby the diaphragm is supported and sealed at its periphery by clamping flange 22. A pressure plate 32 with a small central aperture is positioned atop diaphragm 24, and a helical spring 34 engages plate 32 and biases the diaphragm downwardly.

Upper chamber 26 defines an atmospheric pressure chamber that communicates with the atmosphere through cover port 20. Lower chamber 28 defines a signal pressure chamber and casing wall 14 has a port 36 whereby chamber 28 will receive a pressure signal as will be explained in detail hereinafter.

Body 10 also includes a first or upper conduit 38, a second or lowermost conduit 40, and a third intermediate conduit 42. Such conduits are interconnected by the bore of body 10 to form a flow path therethrough.

A substantially U-shaped tubular guide 44 extends downwardly from lower chamber 28 to a point below conduit 38. An annular flange 46 at the upper end of the guide is joined to the interior of body 10 and fixedly retains the guide in position. An integrally formed throat 48 with a central aperture is situated at the lower end of guide 44.

Throat 48 serves as an anchor for the upper end of a first, resilient rubber plug 50. In unstressed condition, such plug is circular when viewed in horizontal cross-section with a diameter less than that of the bore of body 10, and appears to be rectangular when viewed in vertical cross-section, as in FIG. 1. An axial slot extends therethrough. A second, identical plug 52 is situated axially below plug 50 and is affixed at its lower end to a nub 54 within body 10.

A force-transmitting mechanism is provided to exert axially directed forces upon plugs 50 and 52, and thereby cause the unsupported cylindrical sidewalls of the plugs to be deformed and vary the space between the plugs and the interior of body 10. Such mechanism includes an axially extending valve stem 56 which has a nut 58 secured to its upper end to retain pressure plate 32 in position atop daiphragm 24. The lower end of stem 56 passes through the aperture in throat 48 and terminates in an enlarged cylindrical plunger portion 60 with a depending tang 62. Stem 56 passes through the axial slot in plug 50 and is resiliently engaged by the lower wall of plug 50 so that the plug abuts against plunger portion 60. Tang 62 passes through the axial slot in the upper wall of plug 52 so that the upper wall of the plug is resiliently engaged by the plug while the lower wall of the plug abuts against the underside of plunger portion 60.

The above described structural configuration functions in the following manner as depicted in FIGS. 1 and 2. It is assumed that port 36 communicates with a source of pneumatic pressure, such as a pneumatic transmitter of conventional design, and that conduits 38 and 40 communicate with two different sources of fluid, such as hot and cold water, respectively, and serve as inlets therefor. Conduit 42 serves as an outlet conduit for the fluids introduced into conduits 38 and 40. Both the pneumatic and fluid flow paths are indicated by appropriate arrows in FIG. 1.

In the absence of a pneumatic signal being applied to lower chamber 28 through port 36, diaphragm 24 will flex downwardly as seen in FIG. 1 due to the biasing force of spring 34 and the weight of the force-transmitting mechanism. Such downward flexure causes the sidewalls of plug 52 to deform or bulge outwardly and contact the interior bore of body 10 and prevent communication between inlet conduit 40 and outlet conduit 42. When a pneumatic pressure signal is applied to chamber 28 via port 36, the upward pressures in chamber 28 will exceed the downward forces exerted on the diaphragm, thereby causing diaphragm 24 to move upwardly in seeking an equilibrium position and simultaneously move pressure plate 32 upwardly.

Plate 32, in turn, exerts an upwardly directed axial force upon valve stem 56 through nut 58, and stem 56 and plunger 60 move upwardly with plugs 50 and 52 seated thereon. Such members move relative to guide 44 and throat 48, which is immobile since flange 46 of the guide is permanently secured to the bore of vertical conduit 12 to retain the force-transmitting mechanism in proper axial alignment and to prevent the fluids from entering chamber 28. The relative movement between guide 44 and stem 56 exerts axially directed forces upon plugs 50 and 52.

The forces exerted upon plug 50 cause its unsupported sidewalls to deform outwardly from the unstressed, normal position, as seen in FIG. 1, to a stressed position, as seen in FIG. 2. Simultaneously, plug 52, which is normally stressed and deformed outwardly, as seen in FIG. 1, receives a tensioning force and flexes inwardly away from contact with the interior of conduit 12, as seen in FIG. 2. Thus, it is seen that the same axial force produces opposite reactions upon plugs 50 and 52.

As the sidewalls of plug 50 deform outwardly, the rate of fluid flow between inlet conduit 38 and outlet conduit 42 will be decreased, while flow between inlet conduit 40 and conduit 42 will be established as the sidewalls of plug 52 move away from the interior of body 10.

As the pressure applied to chamber 28 via port 36 is increased, the outward deformation of plug 50 increases until flow between conduits 38 and 42 will be blocked. At this moment, plug 52 will be in unstressed condition and full communication will be established between conduits 40 and 42. Upon termination of the pneumatic pressure signal, diaphragm 24 will be biased to its downward position by spring 32, as seen in FIG. 1, thus re-establishing full communication between conduits 38 and 42 and terminating communication between conduits 40 and 42.

Manifestly, there are a multitude of potential applications for this pneumatically operated control device. To illustrate, when conduit 38 carries a cold fluid and conduit 40 carries a hot fluid, the output temperature of the mixture issuing from conduit 42 can be readily controlled by modulating the signal pressure applied to port 36. Additionally, the control device can be employed as an on-off control for selectively permitting communication between conduits 40 and 42. Such on-off control is effectuated by selecting a spring 32 with a particular, relatively weak spring rate and relying upon a distinct pressure change at port 36 to overcome such spring rate and permit the desired communication.

Obviously, the above described pneumatically operated control device is subject to many modifications, variations and changes in details. For example, conduit 42 could be connected to a source of fluid to function as an inlet conduit which selectively communicates with conduits 38 and 40 to discharge a fluid therethrough in dependence upon the forces exerted upon plugs 50 and 52.

What is claimed is:

1. A pressure responsive control device comprising:
 (a) a housing having inlet and outlet means,
 (b) said inlet means adapted to be connected to a source of pressure,
 (c) said outlet means communicating with ambient pressure,
 (d) pressure responsive means disposed within said housing for regulating the pressure between said inlet and outlet means,
 (e) a body member having a plurality of spaced inlet conduits and a common outlet conduit,
 (f) each of said inlet conduits adapted to be secured to a source of fluid and said common outlet conduit discharging the resultant flow of such fluids,
 (g) a plurality of deformable valve means disposed within said body member between said inlet conduits and said common outlet conduit,
 (h) said valve means, in unstressed condition, permitting fluid communication between each of said inlet conduits and said common outlet conduit,
 (i) said valve means, in stressed condition, blocking fluid communication between each of said inlet conduits and said common outlet conduit, and
 (j) means operatively associated with said pressure responsive means and movable relative to said deformable valve means for simultaneously stressing said plurality of valve means to elastically deform same in response to a pneumatic pressure signal applied to the inlet means of the pressure responsive means.

2. The combination as defined in claim 1 wherein said plurality of deformable valve means comprises a pair of resilient plug members.

3. The combination as defined in claim 2 wherein said resilient plug members, in unstressed condition, are circular in cross-section with a diameter less than the internal diameter of the body member.

4. The combination as defined in claim 2 wherein said plurality of inlet conduits comprises a pair of axially spaced conduits and said outlet conduit is located intermediate the spaced conduits, one of said plug members being disposed within said body member between the upper inlet conduit and the outlet conduit and the other of said plug members being disposed within said body member between the lower inlet conduit and the outlet conduit.

5. The combination as defined in claim 1 wherein one of said plurality of deformable valve means has an axial slot extending therethrough and said body member has a nub therein, said valve means being retained within said body member by the insertion of said nub into said axial slot.

6. The combination as defined in claim 1 wherein said means for stressing said deformable valve means comprises a force-transmitting mechanism interconnecting said pressure responsive means and said valve means.

7. The combination as defined in claim 6 wherein said force-transmitting mechanism comprises a movable valve stem and a guide encircling said stem along its length, said guide being secured to the interior of said body member so that said stem is movable relative to said guide.

8. The combination as defined in claim 7 wherein said force-transmitting mechanism further comprises an enlarged plunger section, a first one of said deformable valve means being circular in cross-section with an axial slot extending therethrough, said valve means being retained in said body member by the engagement of said slot and said guide.

9. The combination as defined in claim 8 wherein said force-transmitting mechanism further comprises a tang extending below said plunger section, a second one of said deformable valve means is circular in cross-section with an axial slot extending therethrough, one wall of said valve means being secured to said tang by engagement of said slot and said tang and another wall of said second valve means being anchored to said body member.

10. The combination as defined in claim 6 wherein said guide has an annular flange at its upper end, said flange being secured to the interior of said body to isolate the fluid flow through said body member from said pressure responsive means disposed within the housing.

References Cited

UNITED STATES PATENTS

| | | | |
|---|---|---|---|
| 951,161 | 3/1910 | Watrous | 137—607 X |
| 2,458,230 | 1/1949 | Warcup | 137—625.4 X |
| 3,058,431 | 10/1962 | Eddy | 251—331 X |
| 3,368,787 | 2/1968 | Sachnik et al. | 251—57 X |

FOREIGN PATENTS

| | | |
|---|---|---|
| 588,762 | 12/1959 | Canada. |
| 629,388 | 10/1961 | Canada. |
| 911,030 | 12/1962 | Great Britain. |
| 416,588 | 12/1946 | Italy. |

M. CARY NELSON, Primary Examiner

M. O. STURM, Assistant Examiner

U.S. Cl. X.R.

251—191